United States Patent [19]
Boonstra et al.
[11] 4,269,898
[45] May 26, 1981

[54] RESISTANCE MATERIAL

[75] Inventors: Alexander H. Boonstra; Cornelis A. H. A. Mutsaers; Franciscus N. G. R. Van der Kruijs, all of Eindhoven, Netherlands

[73] Assignee: U.S. Philips Corporation, New York, N.Y.

[21] Appl. No.: 75,468

[22] Filed: Sep. 14, 1979

[30] Foreign Application Priority Data

Sep. 20, 1978 [NL] Netherlands ........................ 7809553

[51] Int. Cl.[3] ............................................ B32B 15/00
[52] U.S. Cl. .................................... 428/426; 252/518; 423/593; 428/432; 428/697
[58] Field of Search ............... 428/539, 426, 432, 593; 252/518

[56] References Cited

U.S. PATENT DOCUMENTS 4,107,387 8/1978 Boonstra et al. ..................... 428/426

*Primary Examiner*—George F. Lesmes
*Assistant Examiner*—E. Rollins Buffalow
*Attorney, Agent, or Firm*—Norman N. Spain

[57] ABSTRACT

Resistance material consisting of a mixture of metal oxidic compounds, metal oxides, a permanent and a temporary binder, the resistance-determining component consisting of thallium rhodate $TlRh_2O_4$. This component has a linear positive temperature coefficient of the resistance TCR which enables the composition of a resistor having a very low TCR by combining it with a material having a negative TCR. The resistor is produced on the basis of this resistance material provided on a substrate.

7 Claims, No Drawings

RESISTANCE MATERIAL

The invention relates to a resistance material consisting of a mixture of one or more metal oxidic compounds, a permanent and a temporary binder, one or more metal oxides and, possibly, a metal, a metal-rhodate being present in this material as the resistance-determining component, and to a resistor consisting of the resistance material from which the temporary binder has been removed by means of heating, provided with leads and applied onto a substrate.

U.S. Pat. No. 4,107,387 describes such a resistance material in which the resistance-determining component is a metal-rhodate of the composition $M_3Rh_7O_{15}$, M preferably being Pb or Sr.

The advantage of this compound, compared to many previously suggested oxidic compounds for use as the resistance-determining component in resistance material is that it is a completed-reaction product which, with a permanent binder and, possibly, together with an other resistance-determining component having a different temperature dependence can be assembled in a simple manner on a suitable substrate to form a resistor body. Prior to that resistance pastes were available, in which the resistance-determining component was not obtained until firing thereof on a substrate by reaction with a vitreous binder, for example a lead oxide glass. This required rather long firing times (for example half an hour) at a relatively high temperature (approximately 800° C.).

A further advantage is the linear negative temperature coefficient of the resistance (TCR) of this material, which temperature behaviour is rare. Combining this material with the much more common material having a linear, positive temperature coefficient enables the production of resistors having a very low TCR ($/TCR/<100\times10^{-6}/°C.$ in a temperature range of $-100°$ C. to $+200°$ C.).

The invention provides a resistance-determining material having a linear positive TCR, also of the rhodate type, which, together with material having a linear negative TCR can be combined into resistors having a low TCR ($/TCR/<100\times10^{-6}/°C.$ According to the invention the resistance material is characterized in that this resistance-determining component consists of thallium rhodate of the composition $TlRh_2O_4$.

Surprisingly, it was found that this compound which has a completely different crystal structure and a completely different elementary cell as the above-mentioned, known metal rhodate, has a positive linear TCR.

As described above it is possible to assemble resistance bodies having a low TCR value and having a component with a negative linear TCR as the second resistance-determining component.

In accordance with a further elaboration of the invention a metal rhodate $M_3Rh_7O_{15}$ wherein M is preferably Pb or Sr, as stated in the above-mentioned Specification is chosen for this purpose.

Alternatively, a low TCR value can be obtained by substituting, in the thallium rhodate, a metal which owing to its size can be fitted into the thallium rhodate lattice, for example lead, for part of the thallium. Substitution is possible to $Tl_xPb_{(1-x)}Rh_2O_4$, wherein $0.5<x<1$. It is even possible then, when x is small, that the temperature coefficient becomes negative, which enables the combination with material having a positive temperature coefficient.

The resistance body can be produced with material according to the invention by mixing the resistance-determining component(s) with a permanent binder and an organic, temporary binder, which can be removed by means of firing. After application of this mixture on a substrate the temporary binder is volatilized and/or decomposed by heating, the permanent binder ensuring cohesion by means of melting, softening or sintering. The permanent binder is, preferably, a low-melting glass but may also be a synthetic resin material.

The invention will be further explained with reference to the following examples.

Lead thallium rhodate is prepared by heating stoichiometrical ratios PbO, $Tl_2O_3$ and $Rh_2O_3$ in air for 3 hours at 700° C., cooling of the reaction product obtained and grinding it to an average grain size of 0.2 μm.

Mixtures of these powders are mixed in different ratios with glass powder having an average particle size of 1 μm and also in different ratios with lead rhodate $Pb_3Rh_7O_{15}$ and glass powder. The lead rhodate is prepared in a similar manner as the lead thallium rhodate. The mixtures are processed into pastes by means of benzylbenzoate and ethyl cellulose.

The following table shows the compositions of the used glass powders, expressed in a percentage per weight:

| | 1 | 2 | 3 | 4 |
|---|---|---|---|---|
| PbO | 36,9 | 25,0 | 11,7 | 7,2 |
| $Tl_2O$ | 35,1 | 47,4 | 58,5 | 63,1 |
| SiO | 21,1 | 20,5 | 22,1 | 22,1 |
| $B_2O_3$ | 4,8 | 5,1 | 5,0 | 5,0 |
| $Al_2O_3$ | 2,1 | 2,0 | 2,7 | 2,6 |

The pastes are spread onto alundum plates which are dried in the air and thereafter fired in air for 15 minutes. The layer obtained is approximately 20 μm thick.

The following table shows some lead-thallium rhodates mixed with one of the above-mentioned glass compositions and, possibly, mixed with lead rhodate $Pb_3Rh_7O_{15}$, the firing temperature, the resulting surface resistance value R□ and the temperature coefficient of the resistance in $10^{-6}/°C.$

| glass type | $Pb_xTl_{1-x}Rh_2O_4$ molar fraction | $Pb_3Rh_7O_{15}$ molar fraction | X | glass (wt. %) | firing temp. (°C.) | R□(kΩ) | TCR $10^{-6}/°C.$ |
|---|---|---|---|---|---|---|---|
| 1 | 1 | — | 0,3 | 67 | 700 | 0,50 | +10 |
| 1 | 1 | — | 0,2 | 86 | 750 | 6,0 | −60 |
| 2 | 0,2 | 0,8 | 0 | 75 | 750 | 0,38 | +50 |
| 2 | 0,5 | 0,5 | 0 | 89 | 750 | 11,0 | +10 |
| 3 | 1 | — | 0,45 | 75 | 750 | 0,25 | +90 |
| 3 | 0,5 | 0,5 | 0 | 90 | 750 | 23,1 | +60 |
| 3 | 0,5 | 0,5 | 0,2 | 83 | 700 | 2,0 | −40 |
| 3 | 0,33 | 0,67 | 0,1 | 90 | 750 | 22,5 | −60 |

-continued

| glass type | $Pb_xTl_{1-x}Rh_2O_4$ molar fraction | $Pb_3Rh_7O_{15}$ molar fraction | X | glass (wt. %) | firing temp. (°C.) | R□(kΩ) | TCR $10^{-6}$/°C. |
|---|---|---|---|---|---|---|---|
| 3 | 1 | — | 0,3 | 89 | 800 | 7,0 | +75 |
| 4 | 0,5 | 0,5 | 0,1 | 93 | 750 | 1100 | −70 |
| 4 | 0,5 | 0,5 | 0,2 | 90 | 750 | 64 | +40 |

What is claimed is:

1. A resistance material consisting of a mixture of at least one metal oxidic compound, a permanent low melting glass or synthetic resin binder and a temporary organic binder, the at least one metal oxide material comprising a metal rhodate as the resistance-determining component, wherein said resistance-determining component consists of thallium rhodate of the formula $TlRh_2O_4$.

2. A material as claimed in claim 1, wherein it further comprises a component having a negative temperature coefficient of the resistance (TCR) in such a quantity that a desired level of the TCR is achieved.

3. A material as claimed in claim 2, wherein the component having a negative TCR is a metal rhodate of the formula $M_3Rh_7O_{15}$, wherein M=Pb or Sr.

4. A material as claimed in claim 1, wherein in the thallium rhodate part of the thallium is replaced by lead to form the compound of the formula $Tl_xPb_{(1-x)}Rh_2O_4$, wherein $0.5<x<1$.

5. The resistance material of claim 4 wherein an additional component is present having a temperature coefficient of the resistance (TCR) opposite to that of the thallium rhodate of claim 4 in a quantity such that a desired level of the TCR is achieved.

6. The resistor formed by applying the resistance material of claim 1 or 2 or 3 or 4 or 5 to a substrate, heating said resistance material to remove said temporary binder and cause said permanent binder to adhere to said substrate to form thereby a coherent body and providing said resultant coherent body with electrically conducting leads.

7. A compound of the formula $Tl_xPb_{(1-x)}Rh_2O_4$ wherein $0.5\leqq x\leqq 1$.

* * * * *

UNITED STATES PATENT AND TRADEMARK OFFICE

CERTIFICATE OF CORRECTION

PATENT NO. : 4,269,898

DATED : May 26, 1981

INVENTOR(S) : Alexander H. Boonstra et al

It is certified that error appears in the above—identified patent and that said Letters Patent is hereby corrected as shown below:

Col. 3, Line 14, Change "Oxide" to read --Oxidic compound containing--

Signed and Sealed this

*Twenty-second* Day of *September 1981*

[SEAL]

*Attest:*

GERALD J. MOSSINGHOFF

*Attesting Officer* *Commissioner of Patents and Trademarks*